United States Patent [19]

McCarthy

[11] 4,452,714

[45] Jun. 5, 1984

[54] BITUMINOUS COAL REAGENT AND FLOTATION PROCESS

[76] Inventor: James R. McCarthy, 623 Nevin Ave., Sewickley, Pa. 15143

[21] Appl. No.: 30,080

[22] Filed: Apr. 16, 1979

Related U.S. Application Data

[62] Division of Ser. No. 838,237, Sep. 30, 1977, Pat. No. 4,308,132.

[51] Int. Cl.³ .................................................. C09K 3/00

[52] U.S. Cl. ......................................... 252/61; 209/166

[58] Field of Search ............... 209/166, 167; 252/33.6, 252/32.76, 188, 61

[56] References Cited

U.S. PATENT DOCUMENTS

| | | | |
|---|---|---|---|
| 1,652,080 | 12/1927 | Smith | 209/167 |
| 1,788,331 | 1/1931 | Schafer | 209/167 |
| 1,788,332 | 1/1931 | Schafer | 209/167 |
| 1,810,658 | 6/1931 | Kritchevsky | 252/188 X |
| 2,088,624 | 8/1937 | Tschady | 204/167 X |
| 2,265,851 | 12/1941 | Matheson | 252/33.6 X |
| 2,492,936 | 12/1949 | Nohes | 209/167 |
| 2,797,238 | 6/1957 | Miller | 252/32.7 E |
| 2,959,544 | 11/1960 | Smith | 252/32.76 |
| 2,999,813 | 9/1961 | Givens | 252/33.6 |
| 3,536,445 | 10/1970 | Norsly | 252/188 X |
| 3,919,080 | 11/1975 | Stautoi | 209/167 |
| 4,118,331 | 10/1978 | Jahnke | 252/32.7 E |

FOREIGN PATENT DOCUMENTS

| | | | |
|---|---|---|---|
| 491289 | 5/1928 | Fed. Rep. of Germany | 209/167 |
| 378063 | 7/1932 | United Kingdom | 209/167 |

*Primary Examiner*—Bernard Nozick

*Attorney, Agent, or Firm*—Buell, Blenko, Ziesenheim & Beck

[57] ABSTRACT

A reagent and a method for using the reagent for treating a solid material disposed in a liquid medium and having an oxygen-controlled surface condition. The reagent includes a liquid hydrocarbon, a reducing material and an activator material. The liquid hydrocarbon has a specific gravity different from the specific gravity of the liquid medium. The reducing material is present in an amount sufficient to establish a reducing environment around the solid material for breaking the oxygen control on the surface of the solid material. The activator material is present in an amount sufficient to establish an electrostatic charge on the solid material after the oxygen-controlled surface condition has been broken. A more specific feature of the invention is directed to the method of flotation of extremely fine bituminous coal having an oxygen-controlled surface condition. The reagent is useful in froth flotation processes and in bath flotation and separation processes.

2 Claims, No Drawings

BITUMINOUS COAL REAGENT AND FLOTATION PROCESS

This application is a division of copending application Ser. No. 838,237, filed Sept. 30, 1977, now U.S. Pat. No. 4,308,132, issued Dec. 29, 1981.

BACKGROUND OF THE INVENTION

This invention relates to the recovery of bituminous coal by flotation. More particularly, the invention is directed to a reagent for treating a solid material disposed in a liquid medium and having an oxygen-controlled surface condition. The reagent may be used in froth flotation equipment and in other types of continuous and batch flotation processes.

Bituminous coal is a porous material in which environmental gases, such as air, may be entrapped. There are volatile surface products in the coal which unite with oxygen on the surface of a coal particle. There is inorganic material generally referred to in the industry as ash content and includes oxides, carbonates and silicates. All of these factors contribute to the basic problem of an oxygen-controlled surface condition being present on particulate bituminous coal. It is well known in the coal flotation industry, that coal having an oxygen-controlled surface condition will not be wetted by liquid hydrocarbons which are normally used in coal flotation. Consequently, large amounts of coal have not been recovered but have been carried into the refuse ponds and piles wherever there has been a coal production facility.

Froth flotation processes and equipment have been used for many years in the coal recovery industry. Much agitation, both mechanically and through the use of bubbling air, is used to effect the desired flotation. In other words, the environment within which the coal is being treated for flotation is also filled with oxygen. Thus, the environment within the froth flotation process contributes significantly to the maintaining of the oxygen-controlled surface condition on the bituminous coal fines.

The bituminous coal also includes pyritic sulfur and organic sulfur. The presence of a high sulfur content in the coal causes it to become a low grade material which may cause unwanted sulfur compounds being released into the atmosphere when the coal is burned. Further, the coal cannot be used with such high sulfur contents for applications such as C-coal which is a high grade metallurgical coal. The presence of the sulfur in the coal effects the formation of sulfuric acid when the coal is mixed with water. The longer the coal stands in the water, the more acid the water becomes. The acid water effluent is difficult to dispose of. It is a particular problem where such an effluent is being dumped into water tributaries and streams.

Over the years, large deposits of unrecovered coal, flowing from froth flotation processes, has been collected in huge refuse ponds. These ponds may be totally below ground or have been collected in containers above ground. Literally, millions of tons of coal having an oxygen-controlled surface condition lies in these ponds. Vast amounts of the unrecovered bituminous coal is also collected in large piles subjected to the open atmosphere.

It is possible to recover fine coal, that is ten-mesh or finer, in conventional hydrocyclone systems. This conventional type of system, collects the coal fines on the basis of specific gravity or bulk density. It is emphasized, however, that the bituminous coal fines will have an oxygen-controlled surface condition and a relatively high sulfur content. Thus, the ash content and attendant problems of burning such coal will be associated with this type of recovery. That is, the oxygen-controlled surface condition and high sulfur content will have an adverse effect upon the coal used in any subsequent products. For example, it would not be useful for use as metallurgical coal and is doubtful whether it would be usable for making coke.

.The U.S. Pat. Nos. 1,156,041, 1,425,187, 1,593,232, 2,198,915 and 2,492,936, disclose various types of reagents, bath flotation systems and froth flotation processes using various types of reagents. All of these prior art reagents operate in the presence of high oxygen environmental conditions, both from a chemical and a mechanical standpoint. Chemically, the reagents incorporate the use of combined oxygen. Mechanically, the bubbling of air aggravates the oxygen-controlled surface condition on the bituminous coal fines. While the prior art makes reference to the cleaning of the oxide from the surface of sulfide particles with sulfuric acid, such a cleaning is deemed not chemically possible. Also, the prior art processes are designed, generally, to avoid the formation of hydrogen sulfide during the process of concentrating mineral ores by flotation. Various other distinctions over the prior art flotation techniques will be evident as the present invention is described herein.

PURPOSE OF THE INVENTION

The primary object of this invention is to provide a novel reagent for treating a solid material disposed in a liquid medium and having an oxygen-controlled surface condition.

Another object of this invention is to provide a reagent for effecting the flotation of bituminous coal disposed in water.

A further object of this invention is to provide a process for treating a mixture of different solid materials in a liquid body, wherein one of the solid materials has an oxygen-controlled surface condition. This material is wetted with a liquid hydrocarbon and subsequently separated from the tailings.

A still further object of the invention is to provide a reagent and a method for effecting flotation of bituminous coal from refuse ponds and piles.

SUMMARY OF THE INVENTION

The reagent of the invention as described herein comprises a liquid hydrocarbon, a reducing material and an activator material. The liquid hydrocarbon has a specific gravity different from the specific gravity of the liquid medium in which solid material is disposed. The reducing material is present in an amount sufficient to establish a reducing environment around the solid material for eliminating the oxygen-controlled surface condition thereon. The activator material is present in an amount sufficient to establish an electrostatic charge on the solid material after the oxygen-controlled surface condition has been eliminated. More specifically, such a reagent is used to treat bituminous coal disposed in water and having an oxygen-controlled surface condition thereon. Such a bituminous coal material is normally not wettable by a liquid hydrocarbon, and thus cannot be recovered in existing flotation methods.

Another feature of the invention is the use of the reagent in existing froth flotation processes which include the use of agitating equipment and air bubbles.

A further feature of this invention is directed to the process of treating particulate bituminous coal by introducing a supply of hydrogen sulfide into the liquid medium in which the coal is disposed. It is theorized that the action of the hydrogen sulfide in the liquid medium will result in a hydrogen ion and a sulfide ion being formed for acting upon the oxygen and sulfur content of the bituminous coal. The oxygen control of the surface is broken. It has been found that the use of the reagents of this invention also reduces the amount of sulfur in the bituminous coal being recovered. The liquid hydrocarbon in the liquid medium wets the particulate coal after the oxygen control has been eliminated thereby causing it to float on top of the liquid medium.

A reagent useful in effecting the process of introducing the hydrogen sulfide includes a phosphorous pentasulfide, carbon disulfide, zinc ethylenebis(dithiocarbamate) and a liquid hydrocarbon having a paraffinic base. The phosphorous pentasulfide is present in amounts sufficient to establish a reducing environment around the coal disposed in the liquid medium. The carbon disulfide is an intermediate solvent for dissolving the phosphorous pentasulfide and the zinc ethylenebis(dithiocarbamate). A zinc ion is provided when the zinc ethylenebis(dithiocarbamate) is dissolved in the carbon disulfide. The liquid hydrocarbon is present in an amount sufficient to contain the zinc ion and wet the liberated bituminous coal fines. The carbon disulfide is present in an amount sufficient to contain the phosphorous pentasulfide and zinc ethylenebis(dithiocarbamate) in solution.

A further feature of the invention is directed to the particular process of forming the bituminous coal reagent being used to recover the bituminous coal fines.

In accordance with another feature of the invention, a polar solvent may be added to the reagent for the purpose of promoting the reactions involving the ionization. This provides a high dielectric constant thereby resulting in establishing a high electric potential within the electrolyte. More specifically, the polar solvent, acetonitrile (methylcyanide; cyanomethane) is used in those processes other than froth flotation processes.

The above features of the invention are based on the discovery that the bituminous coal fines may be wetted in a liquid hydrocarbon after a reducing environment has been established therearound. The reagent of the present invention effects ionization in the electrolyte for eliminating the oxygen on the surface of the bituminous coal. The liquid hydrocarbon in the reagent carries an ion with it when the bituminous coal fines are liberated from the oxygen. The presence of the ion places a strong positive charge on the coal wetted with the liquid hydrocarbon. The tailings in the electrolyte are known to carry a positive charge as suggested in the U.S. Pat. No. 1,425,187. Thus, there is a repulsion that exists between the wetted coal particles having the ion associated therewith and the tailings.

The exact chemical composition of the reaction products formed in the blending of the reagent has not been fully determined. However, it has been determined that specific chemical compounds will operate to effect the specific desired results; namely, the eliminating of the oxygen control on the surface of the bituminous coal and the placing of a positive electrochemical charge thereon. The coal will thus be driven in and on the liquid hydrocarbon existing on top of the water acting as a liquid medium for the electrolyte. The use of the disclosed reagents will be effective to float bituminous coal particles having a size in the range of about 28 mesh to 425 mesh. In other words, it is anticipated that the reagents of this invention are capable of recovering all of the bituminous coal present in the mixture.

A theoretical explanation of the reactions taking place is offered without being limited to it. It is believed that the hydrogen ion formed in the electrolyte will combine with the oxygen on the oxygen-controlled surface of the bituminous coal to form water. It is further believed that the sulfur ion formed in the electrolyte will combine with sulfur in the bituminous coal to form elemental sulfur which will precipitate out. The hydrogen and sulfur ions may be provided by bubbling hydrogen sulfide gas through water as an electrolyte or by dissolving a chemical compound such as phosphorous pentasulfide in the electrolyte. The inclusion of zinc thiophosphate into the electrolyte will provide the zinc ion, the hydrogen ion and the sulfur ion which will accomplish the results set forth herein. The zinc thiophosphate is believed formed when ethylenebis(dithiocarbamate) is added to the mixture containing phosphorous pentasulfide.

As far as can be determined, it is believed that this invention incorporates, for the first time, a liquid hydrocarbon with a paraffinic base as a part of a flotation reagent. The liquid hydrocarbon, used in the specific examples of this invention, is mineral oil that is free of any oxygenated compounds. Carbon disulfide is used as an intermediate solvent in which solid phosphorous pentasulfide and solid zinc ethylenebis(dithiocarbamate) are dissolved. The zinc ion is thereby present in the reagent being added to the electrolyte. Generally, the amount of reagent useful in this invention is 1 to 10 parts per million of material being treated. It is recognized, that in most prior art flotation systems, that there exists ten percent solids and ninety percent liquids. One of the new and unexpected results associated with the use of the reagent made in accordance with this invention, is that the flotation system may be used with fifty percent solids and fifty percent liquids. That is, the ratio of solids to water has been reduced from 1:9 to 1:1 thereby effecting a savings in water resources. The reagent is composed of a concentrate including the reducing material and the activator material and the liquid hydrocarbon having a specific gravity different from the specific gravity of the liquid medium in which the solid material is to be floated. With respect to the bituminous coal reagent, the reducing material is phosphorous pentasulfide and the activator material is contained in the zinc ethylenebis(dithiocarbamate). The concentrate composed of these materials is in a specific ratio with respect to the liquid hydrocarbon ranging from about 1:3 to about 1:1 in the bituminous coal reagent.

These materials are blended in a very specific fashion which is deemed to be new and patentable. A supply of carbon disulfide is provided as an intermediate solvent material. The intermediate solvent is maintained at a temperature sufficient to provide suitable blending conditions for the phosphorous pentasulfide and zinc ethylenebis(dithiocarbamate). This temperature range may be from about 70° F. to 80° F. The solid materials of phosphorous pentasulfide and zinc ethylenebis(dithiocarbamate) are completely dissolved in the carbon disulfide intermediate solvent material to form a resultant concentrate. Subsequently, the concentrate is then mixed with the liquid hydrocarbon in the noted relative ratio range.

Where there is no significant agitation or aggravation through the introduction of air bubbles, in accordance with another feature of the invention, a polar solvent is added to the liquid hydrocarbon in an amount effective to promote the ionization which produces the ion therein. This polar solvent also improves any ionization which produces the desired ions within the electrolyte to produce the desired results in the processes of the invention.

More specifically, with respect to the process of treating a mixture of different solid materials in a liquid body, a reagent made in accordance with this invention is introduced into the liquid in an amount sufficient to form a film of liquid hydrocarbon on top of the liquid body. It is presumed that one of the solid materials in the liquid body has an oxygen-controlled surface condition. In a specific example, the bituminous coal having an oxygen-controlled surface condition, is mixed with tailings within a body of water. The reagent includes a reducing material that is present in an amount sufficient to establish a reducing environment around the solid material for breaking the oxygen control thereon. The reagent also includes an activator material that is present in an amount sufficient to establish a positive electrostatic charge on the coal after the oxygen-controlled surface condition has been eliminated. The reagent includes an anion which produces a charge on the coal when it is wetted by the liquid hydrocarbon. Thus, there is an electrostatic repulsion between the treated bituminous coal fines and the tailings bearing a similar positive charge thereon.

The invention will be described in the following specific examples which set forth the preparation of typical reagents and their use in the process of the invention.

EXAMPLE I

The following composition of a reagent was used in a standard froth flotation system.

| Chemical Constitutent | Amounts(Parts by Volume) |
|---|---|
| Carbon disulfide | 50 parts |
| Zinc ethylenebis(dithiocarbamate) | 25 parts |
| Phosphorous pentasulfide | 25 parts |

The zinc ethylenebis(dithiocarbamate) and phosphorous pentasulfide were dissolved in the carbon disulfide to form the reagent concentrate. The zinc ethylenebis(-dithiocarbamate) is commercially available as Zineb from DuPont. One part of the reagent concentrate was then mixed with three parts of mineral oil having a paraffinic base.

The resultant reagent was then substituted for the existing reagent being used in an operational froth flotation system. The reagent was added to the system within the range of 1 to 10 parts per million of reagent to mixture being treated. Bituminous coal particles were recovered on the top of the liquid body in the range of from 7.5 to 10 tons of coal for each gallon of reagent being used.

EXAMPLE II

A reagent concentrate having the following composition was prepared for use in a bath flotation or separation unit.

| Chemical Constituent | Amounts(Parts by Volume) |
|---|---|
| Carbon disulfide | 50 parts |
| Zinc ethylenebis(dithiocarbamate) | 24 parts |
| Phosphorous pentasulfide | 25 parts |
| Acetonitrile | 1 part |

The solid materials were first dissolved in the carbon disulfide. The acetonitrile was then added to the concentrate (or to the liquid hydrocarbon). One part of the concentrate was then mixed with one part of mineral oil having a paraffinic base. The resultant reagent was then mixed with the liquid body of water in which was contained bituminous coal fines having an oxygen-controlled surface condition and tailings. These tailings are also known in the industry, generally, as oxides, as referred to hereinabove.

Upon mixing the reagent in the liquid body, the liberated bituminous coal particles were collected in and upon the film of liquid hydrocarbon formed on the surface of the water.

It is evident that conventional types of equipment may be used to effect the skimming of the collected bituminous coal fines from the top of the electrolyte forming the liquid medium. The resultant materials obtained from the use of the reagent, made in accordance with this invention, have a very low percentage of water content and thus can be dried at a higher rate of speed and with less energy cost associated therewith. Furthermore, the resultant float product is an agglomerate which may be easily handled for subsequent operations.

It has been found that the sulfur content of the bituminous coal fines being recovered in accordance with this invention, is less than the sulfur content of the fines before being subjected to the action of the reagent disclosed herein.

While the bituminous coal reagent and flotation process has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A bituminous coal floating reagent comprising:
   a. phosphorous pentasulfide in amounts sufficient to establish a reducing environment around bituminous coal disposed in a liquid medium,
   b. carbon disulfide as an intermediate solvent for dissolving the phosphorous pentasulfide,
   c. zinc ethylenebis (dithiocarbamate) dissolved in the intermediate solvent in an amount effective to provide a zinc cation and
   d. a liquid hydrocarbon having a paraffinic base and being in an amount sufficient to contain the phosphorous pentasulfide and zinc ethylenebis (dithiocarbamate) in solution, said liquid hydrocarbon including a polar solvent in an amount effective to promote the ionization which produces said cation.

2. A reagent as defined in claim 1 wherein the polar solvent is acetonitrile.

* * * * *